United States Patent
Kim et al.

(10) Patent No.: US 10,360,452 B2
(45) Date of Patent: Jul. 23, 2019

(54) WEARABLE DEVICE AND VEHICLE DIAGNOSIS APPARATUS INCLUDING THE SAME

(71) Applicants: HYUNDAI MOTOR COMPANY, Seoul (KR); KIA MOTORS CORPORATION, Seoul (KR)

(72) Inventors: Hyuk Lae Kim, Guri-si (KR); Jae Hun Choi, Bucheon-si (KR); Sechang Kim, Gunpo-si (KR); Ho Jong Yoo, Seoul (KR); Dong Il Kim, Seoul (KR); Yong Sun Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/358,931

(22) Filed: Nov. 22, 2016

(65) Prior Publication Data

US 2017/0308751 A1    Oct. 26, 2017

(30) Foreign Application Priority Data

Apr. 26, 2016    (KR) ..................... 10-2016-0050813

(51) Int. Cl.
*G06F 3/01* (2006.01)
*G06F 3/16* (2006.01)
(Continued)

(52) U.S. Cl.
CPC ......... *G06K 9/00671* (2013.01); *G06F 3/013* (2013.01); *G06F 3/017* (2013.01);
(Continued)

(58) Field of Classification Search
CPC ..... G06K 9/00671; G06F 3/013; G06F 3/017; G06F 3/167; G06T 11/60
See application file for complete search history.

(56) References Cited

U.S. PATENT DOCUMENTS

| 7,362,738 B2 | 4/2008 | Taube et al. |
| 2007/0036117 A1* | 2/2007 | Taube ............... H04W 4/02 370/338 |
| 2013/0271574 A1* | 10/2013 | Dorrance ........... H04N 7/18 348/46 |

FOREIGN PATENT DOCUMENTS

| JP | 2011-248860 A | 12/2011 |
| JP | 2015-105072 A | 6/2015 |

(Continued)

OTHER PUBLICATIONS

English translation of Notice of Allowance dated May 21, 2018 issued in Korean Patent Application No. 10-2017-0150345.

*Primary Examiner* — Kevin M Nguyen
(74) *Attorney, Agent, or Firm* — Morgan, Lewis & Bockius LLP

(57) ABSTRACT

This disclosure provides a wearable device providing a user with information required for diagnosis and repair of a vehicle using an augmented reality image and receiving a control instruction of the user by a gesture, eye gaze, or speech and a vehicle diagnosis apparatus including the same. The vehicle diagnosis apparatus includes a wearable device configured to acquire a forward image of a user; a controller configured to recognize at least one selected from the group consisting of a gesture and an eye gaze of the user from the forward image and determine a part of a vehicle corresponding to a position of the recognized gesture or the recognized eye gaze; and a communication device configured to transmit a diagnostic trouble code (DTC) request message about the determined part to the vehicle and receive a DTC about the determined part from the vehicle.

23 Claims, 20 Drawing Sheets

(51) Int. Cl.
*G06K 9/00* (2006.01)
*G07C 5/08* (2006.01)
*G06T 11/60* (2006.01)
*G10L 15/22* (2006.01)

(52) U.S. Cl.
CPC .............. *G06F 3/167* (2013.01); *G06T 11/60* (2013.01); *G07C 5/0808* (2013.01); *G07C 5/0825* (2013.01); *G07C 2205/02* (2013.01); *G10L 2015/223* (2013.01)

(56) References Cited

FOREIGN PATENT DOCUMENTS

| KR | 10-2011-0118506 A | 10/2011 |
| KR | 10-2012-0015802 A | 2/2012 |
| KR | 10-2014-0145332 A | 12/2014 |

* cited by examiner

FIG. 14
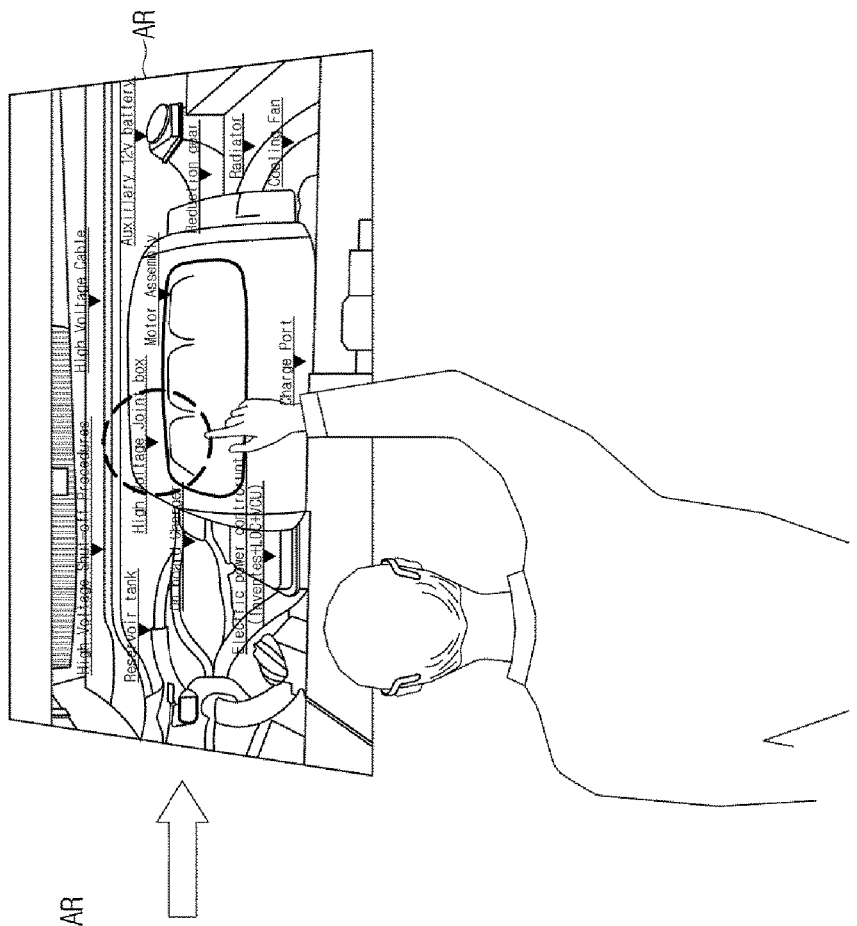
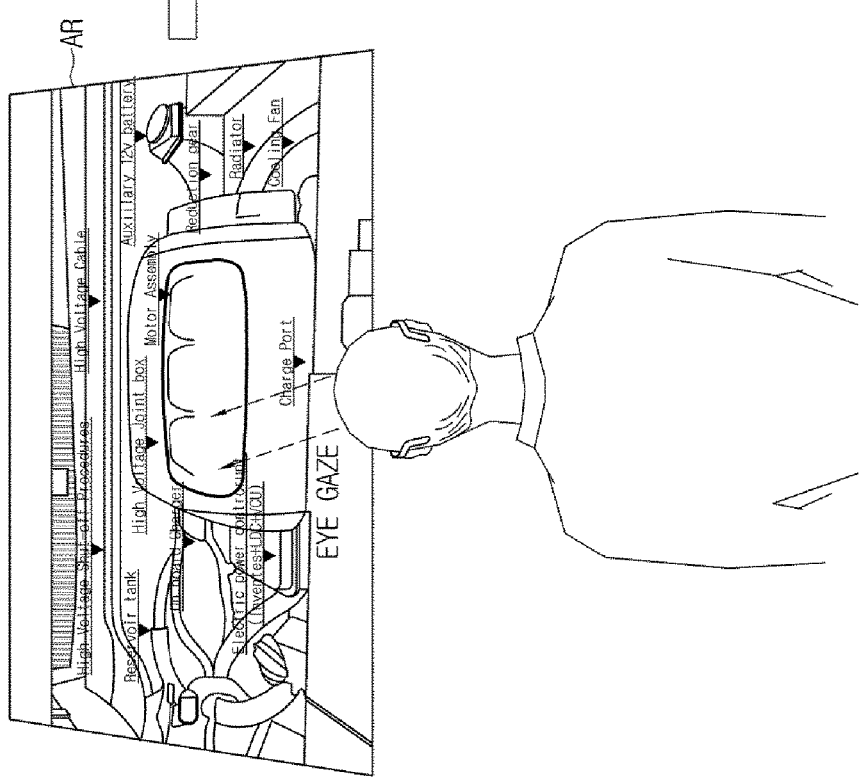
① EYE GAZE RECOGNITION → ② SYSTEM DETERMINATION
③ GESTURE RECOGNITION → ④ PART DETERMINATION

WEARABLE DEVICE AND VEHICLE DIAGNOSIS APPARATUS INCLUDING THE SAME

CROSS-REFERENCE TO RELATED APPLICATION(S)

This application claims the benefit of Korean Patent Application No. 10-2016-0050813, filed on Apr. 26, 2016 in the Korean Intellectual Property Office, the disclosure of which is incorporated herein by reference.

TECHNICAL FIELD

Embodiments of the present disclosure relate to wearable devices for vehicle diagnosis and vehicle diagnosis apparatuses including the same.

BACKGROUND

In general, a repair technician diagnoses a malfunction of a vehicle by scanning a diagnostic trouble code (DTC) indicated by the vehicle by using a portable vehicle diagnosis apparatus with scanning capability and repairs the vehicle with reference to the DTC.

Since the repair technician simultaneously performs a search for information and a repair of the vehicle using the portable vehicle diagnosis apparatus, work efficiency may decrease, and utilization of information and efficiency and reliability of the result of work may vary depending on technical proficiency of the repair technician.

SUMMARY

Therefore, it is an aspect of the present disclosure to provide a wearable device providing a user with information required for diagnosis and repair of a vehicle using an augmented reality image and receiving a control instruction of the user by a gesture, eye gaze, or speech and a vehicle diagnosis apparatus including the same.

Additional aspects of the disclosure will be set forth in part in the description which follows and, in part, will be obvious from the description, or may be learned by practice of the disclosure.

According to an aspect of an exemplary embodiment, a vehicle diagnosis apparatus comprises a wearable device configured to acquire a forward image of a user; a controller configured to recognize at least one selected from the group consisting of a gesture and an eye gaze of the user from the forward image and determine a part of a vehicle corresponding to a position of the recognized gesture or the recognized eye gaze; and a communication device configured to transmit a diagnostic trouble code (DTC) request message about the determined part to the vehicle and receive a DTC about the determined part from the vehicle.

The wearable device provides the user with an augmented reality image.

The controller recognizes one from a plurality of parts comprised in the vehicle from the forward image and transmits information about the recognized part to the wearable device.

The wearable device outputs an augmented reality image comprising information about the recognized part.

The wearable device outputs an augmented reality image overlaying information about the recognized part on a position of the recognized part.

The controller determines a part located at a position corresponding to the recognized gesture or the recognized eye gaze as a target part of malfunction diagnosis.

The apparatus further comprises a storage configured to store a plurality of single parts comprised in the vehicle in groups classified according to a plurality of systems.

The controller recognizes an eye gaze of the user from the forward image, determines a system of the vehicle corresponding to a position of the recognized eye gaze, recognizes a gesture of the user from the forward image, and determines a single part corresponding to a position of the recognized gesture among single parts comprised in the determined system.

The controller determines a single part located at a position corresponding to the recognized gesture or the recognized eye gaze and determines a system comprising the determined single part as a target of malfunction diagnosis.

The communication device transmits a DTC request message about the target part of malfunction diagnosis to the vehicle and receives a DTC about the target part of malfunction diagnosis from the vehicle.

The wearable device receives an input speech of the user and converts the input speech into an electric speech signal, and the controller recognizes a command comprised in the speech signal and determines a part corresponding to the recognized command as the target part of malfunction diagnosis.

The wearable device outputs information to guide a repair of the part indicated by the DTC as an augmented reality image.

The wearable device outputs an augmented reality image overlaying information to guide the repair of the part indicated by the DTC on a position of the part.

When the information to guide the repair of the part comprises a plurality of stages, the controller recognizes a gesture of the user from the forward image and transmits a control signal to output information of a next stage among the plurality of stages to the wearable device when the recognized gesture is a prestored gesture.

The wearable device outputs an augmented reality image overlaying a predetermined color on a position of the part indicated by the DTC.

The controller recognizes a gesture of the user from the forward image and transmits a control signal to remove the augmented reality image to the wearable device when the recognized gesture is a prestored gesture.

According to another aspect of an exemplary embodiment, a wearable device comprises an imaging device configured to acquire a forward image of a user; a controller configured to recognize at least one selected from the group consisting of a gesture and an eye gaze of the user from the forward image and determine a part of a vehicle corresponding to a position of the recognized gesture or the recognized eye gaze; and a communication device configured to transmit a diagnostic trouble code (DTC) request message about the determined part to the vehicle and receive a DTC about the determined part from the vehicle.

The wearable device further comprises a display configured to output an augmented reality image overlaying a virtual image on a space at which the user gazes.

The controller determines a part located at a position corresponding to the recognized gesture or the recognized eye gaze as a target part of malfunction diagnosis.

The wearable device further comprises a storage configured to store a plurality of single parts comprised in the vehicle in groups classified according to a plurality of systems.

The controller recognizes an eye gaze of the user from the forward image, determines a system of the vehicle corresponding to a position of the recognized eye gaze, recognizes a gesture of the user from the forward image, and determines a single part corresponding to a position of the recognized gesture among single parts comprised in the determined system.

The controller determines a single part located at a position corresponding to the recognized gesture or the recognized eye gaze and determines a system comprising the determined single part as a target of malfunction diagnosis.

The wearable device further comprises a microphone configured to receive an input speech of the user and convert the input speech into an electric speech signal, wherein the controller recognizes a command comprised in the speech signal and determines a part corresponding to the recognized command as a target part of malfunction diagnosis.

The display outputs information to guide a repair of the part indicated by the DTC as an augmented reality image.

The display outputs an augmented reality image overlaying information to guide the repair of the part indicated by the DTC on a position of the part.

When the information to guide the repair of the part comprises a plurality of stages, the controller recognizes a gesture of the user from the forward image and transmits a control signal to output information of a next stage among the plurality of stages to the wearable device when the recognized gesture is a prestored gesture.

The display outputs an augmented reality image overlaying a predetermined color on a position of the part indicated by the DTC.

The controller recognizes a gesture of the user from the forward image and transmits a control signal to remove the augmented reality image to the wearable device when the recognized gesture is a prestored gesture.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 14 is a view illustrating an example of selecting a target part of malfunction diagnosis by combining eye gaze recognition and gesture recognition.

DETAILED DESCRIPTION

Figure 1:
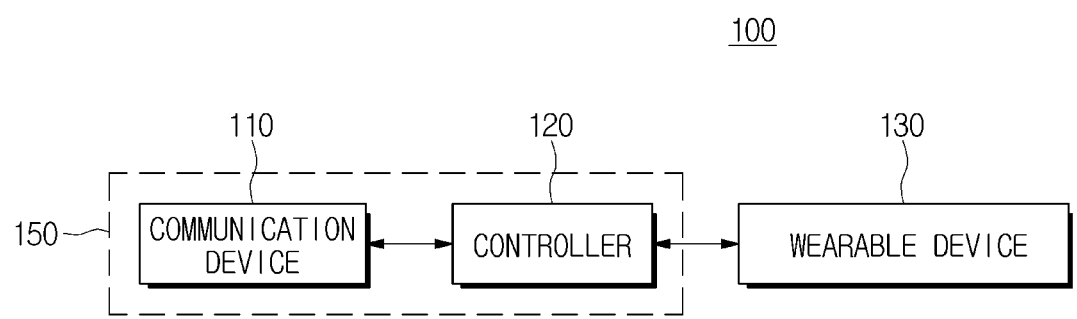
FIG. 1 is a control block diagram of a vehicle diagnosis apparatus according to an embodiment.

Reference will now be made in detail to the embodiments of the present disclosure, examples of which are illustrated in the accompanying drawings, wherein like reference numerals refer to like elements throughout.

Hereinafter, a wearable device, a vehicle diagnosis apparatus including the same, and a method of diagnose a vehicle will be described in detail with reference to the accompanying drawings.

FIG. 1 is a control block diagram of a vehicle diagnosis apparatus according to an embodiment.

Referring to FIG. 1, a vehicle diagnosis apparatus 100 includes a communication device 110 configured to transmit a diagnostic trouble code (DTC) request message to a vehicle or receive a DTC from the vehicle, a controller 120 configured to control the overall operation of the vehicle diagnosis apparatus 100, and a wearable device 130 configured to provide the user with various information related to vehicle diagnosis.

The communication device 110 includes a communication module that communicates with the vehicle. The communication module may be a wireless communication module or a wired communication module.

In case of the wireless communication module, the communication device 110 may include at least one of a Wireless LAN such as Wi-Fi, Bluetooth, ZigBee, Wi-Fi Direct (WFD), Ultra-wideband (UWB), Infrared Data Association (IrDA), and Bluetooth Low Energy (BLE).

In case of the wired communication module, the communication device 110 may include a connection port, a cable, or a connector to be connected to the vehicle.

The communication device 110 may include both the wireless communication module and the wired communication module.

In addition, the communication device 110 may further include a wireless communication module for communication with an external server that integrally manages diagnosis of malfunctions of vehicles. The wireless communication module may employ 3G communication technologies, 4G communication technologies such as Long Term Evolution (LTE) and Wireless Broadband Evolution, and 5G communication technologies.

Also, the communication device 110 may communicate with the external server by using a wireless communication module supporting communication with the vehicle.

The controller 120 may control transmitting and receiving data to and from the vehicle and process and control information input via the wearable device 130 or information to be provided to the user via the wearable device 130.

Particularly, the controller 120 may transmit and receive the DTC request message to and from the vehicle via the communication device 110. Upon receiving the DTC from the vehicle, the controller 120 may generate a control signal to control the wearable device 130 based on the received DTC.

In addition, the controller 120 may determine a control instruction input by the user by analyzing an image or speech received via the wearable device 130. Or, the controller 120 may transfer the received image or speech to the external server for analysis thereof.

The controller 120 may include a memory to store a program performing operations, which are described above or will be described later, and data required to execute the program and a processor to execute the stored program.

Meanwhile, the controller 120 may constitute one physical module, i.e., a control module 150, together with the communication device 110. In this case, the communication device 110 may further include a communication module for communication with the wearable device 130 in addition to the vehicle or the external server or may communicate with the wearable device 130 using one of the aforementioned communication modules. If the wearable device 130 is connected to the control module 150 in a wireless manner, a local-area communication module may be used. If the wearable device 130 is connected thereto in a wired manner, a cable may be used.

Alternatively, the controller 120 and the communication device 110 may be integrated into the wearable device 130 instead of constituting a separate physical module. In this case, the wearable device 130 may directly transmit and receive data to and from the vehicle and the external server and directly analyze an image acquired by the wearable device 130 or a speech input via the wearable device 130. This will be described later in more detail.

The wearable device 130 may be a mobile electronic device that is carried and worn by the user. For example, the wearable device 130 may have various shapes such as eyeglasses, head-sets, and wristwatches worn by the user. However, the shapes of the wearable device 130 are not limited thereto, and the wearable device 130 may have any shape and may be worn by any position of the human body so long as the wearable device 130 performs functions described herein.

The wearable device 130 may acquire images of the vehicle to be diagnosed and repaired and transmit the acquired images of the vehicle to the controller 120. In addition, the wearable device 130 may guide a malfunction diagnosis of the vehicle and a repair in accordance therewith by providing visual information to the user according to the control signal received from the controller 120. Hereinafter, operation and configuration of the wearable device 130 will be described in more detail.

Figure 2:
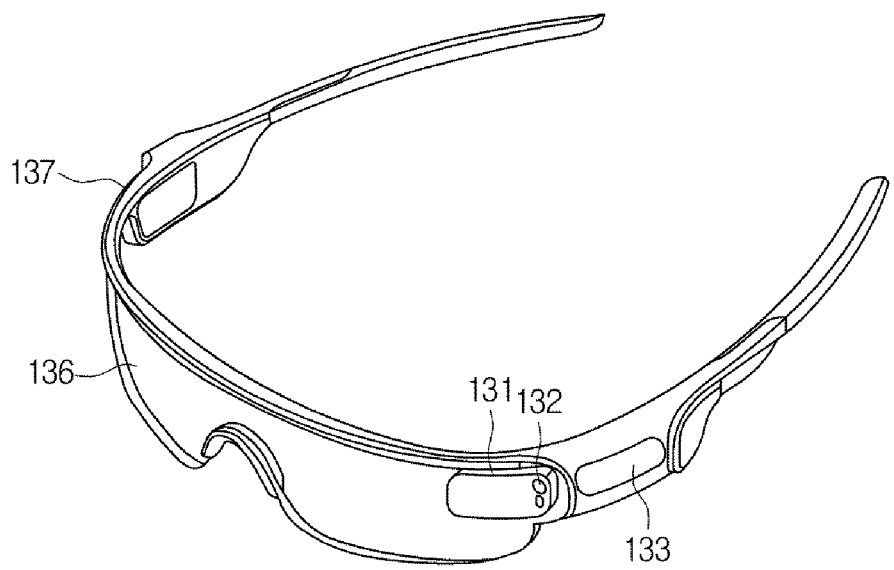
FIG. 2 is a perspective view of a wearable device according to an embodiment.
Figure 3:
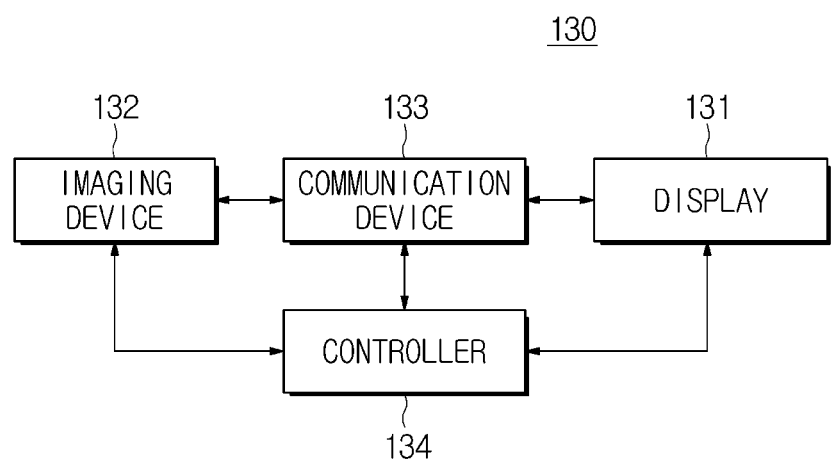
FIG. 3 is a control block diagram of a wearable device according to an embodiment.

FIG. 2 is a perspective view of a wearable device according to an embodiment. FIG. 3 is a control block diagram of a wearable device according to an embodiment.

Hereinafter, an eye-glasses type wearable device will be exemplarily described.

Referring to FIGS. 2 and 3, the wearable device 130 includes a display 131 configured to provide a user with visual information, an imaging device 132 configured to acquire an image corresponding to an eye gaze of the user, a communication device 133 configured to communicate with the control module 150 to transmit and receive data to and from the control module 150, and a controller 134 configured to control the overall operation of the wearable device 130.

The display 131 provides the user with an augmented reality image. Augmented reality is a technology providing a view in which a virtual image is integrated with a real world background. The display 131 provides the user with information related to a region at which the user gazes such as an engine room or a lower portion of the vehicle subject to a malfunction diagnosis or repair as a virtual image. In this case, the user may be a person wearing the wearable device 130. For example, the user may be a repair technician who wears the wearable device 130 and maintains and repairs the vehicle. Hereinafter, a repair technician will be described as the user for descriptive convenience.

For example, the display 131 may include a projector configured to output light beams having image information and a prism configured to reflect the output light beams toward pupils of the user. An image is directly focused on a retina by the light beams incident on a pupil and transferred to the brain via optical nerves.

As another example, the display 131 may include a projector configured to output light beams and a film embedded in a lens 136. An image output from the projector is projected to the film embedded in the lens 136.

Besides, various other technologies providing augmented reality images may also be applied thereto, and the configuration of the display 131 may be modified in accordance with the applied technologies.

The imaging device 132 may be mounted on a support part 137 that supports various parts of the wearable device 130 such as the lens 136 and allows the user to wear the wearable device 130. The imaging device 132 may be mounted to face forward such that images of areas corresponding to the eye gaze of the user are acquired. For example, the imaging device 132 may be mounted at an upper portion of the lens 136 or at a side portion of the lens 136 within a range not shielding the field of vision of the user. A mounting position of the imaging device 132 is not limited so long as the imaging device 132 acquires images of areas where the user looks.

The imaging device 132 may include a camera that acquires an actual image such as a charge coupled device (CCD) camera and a complementary metal oxide semiconductor (CMOS) camera. The imaging device 132 may periodically acquire moving images or still images.

The communication device 133 may transmit an image acquired by the imaging device 132 to the control module 150 and receive a virtual image signal or a control signal from the control module 150.

The controller 134 may control acquiring of the forward image and providing of the augmented reality image by controlling the imaging device 132 and the display 131.

Figure 4:
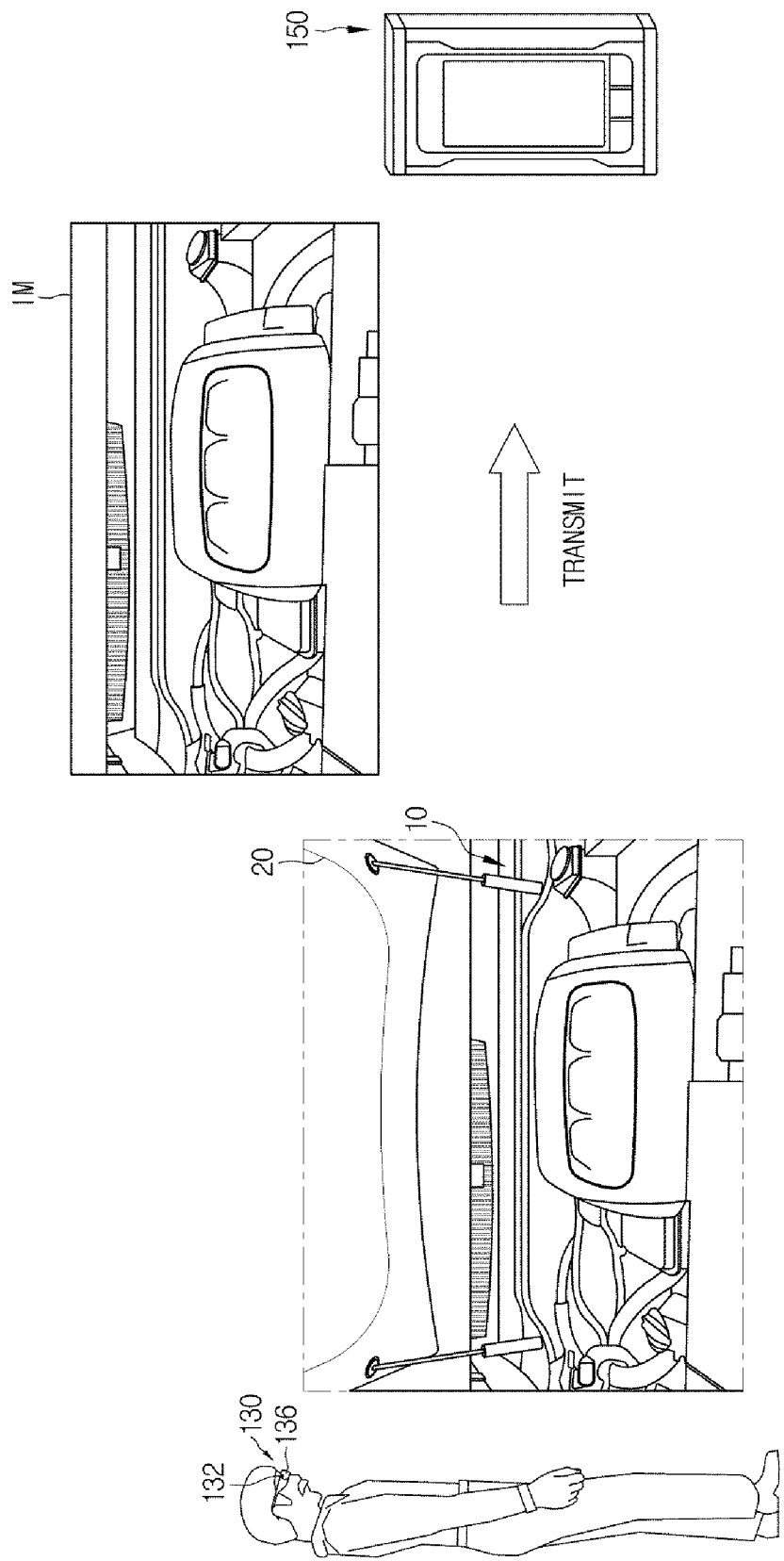
FIG. 4 is a view illustrating a process of transferring an image acquired by a wearable device to a control module.

FIG. 4 is a view illustrating a process of transferring an image acquired by a wearable device to a control module.

Referring to FIG. 4, when the user wearing the wearable device 130 opens a bonnet 20 and gazes at an engine room 10, the imaging device 132 of the wearable device 130 acquires an image of the engine room 10. An acquired engine room image IM is transmitted to the control module 150 via the communication device 133.

Although the engine room 10 will be described as a part of the vehicle subject to vehicle maintenance in the following embodiments for detailed descriptions, embodiments of the present disclosure are not limited thereto, and embodiments of the present disclosure may also be applied to any part of the vehicle subject to the vehicle maintenance, such as a lower portion of the vehicle, as well as the engine room 10.

The controller 120 of the control module 150 may process the engine room image IM and identify positions of various parts of the engine room 10. To this end, the controller 120 may recognize the parts of the engine room image IM by applying an object recognition algorithm thereto.

For example, the controller 120 may recognize each of the parts from the engine room image IM by prestoring visibly distinguishable characteristics of the parts of the engine room and applying the object recognition algorithm thereto.

For example, the controller 120 may detect an object having a uniform outline based on pixel values constituting the engine room image IM and recognize a detected object as a given part if the detected object has prestored characteristics of the given part.

Characteristics of the parts of the engine room 10 may be stored in a database on the basis of part type. Not only the database of characteristics of the parts of the engine room 10, but also a database of characteristics of the lower portion of the vehicle may be created. A database may also be created on the basis of vehicle types. Thus, when the user selects the type of the vehicle currently subject to vehicle maintenance and the engine room 10 or the lower portion of the vehicle, the controller 120 may recognize the part corresponding to the selection by using the database. The database may be stored in the controller 120 or a storage 140, which will be described later.

As another example, the controller 120 may recognize an object as a reference from the engine room image IM and identify positions of the other parts based on relative positions with respect to the recognized object. To this end, the positions of the other parts may be prestored in the form of two-dimensional (2D) or three-dimensional (3D) coordinates. Since the relative positions and alignments of the parts may vary depending on the types of the vehicle, the relative positions of the parts may be stored in a database on the basis of vehicle types.

For example, the controller 120 may recognize a joint box from the engine room image IM by applying the object recognition algorithm thereto and recognize a position of another part with reference to the position of the joint box based on a prestored relative position.

Figure 5:
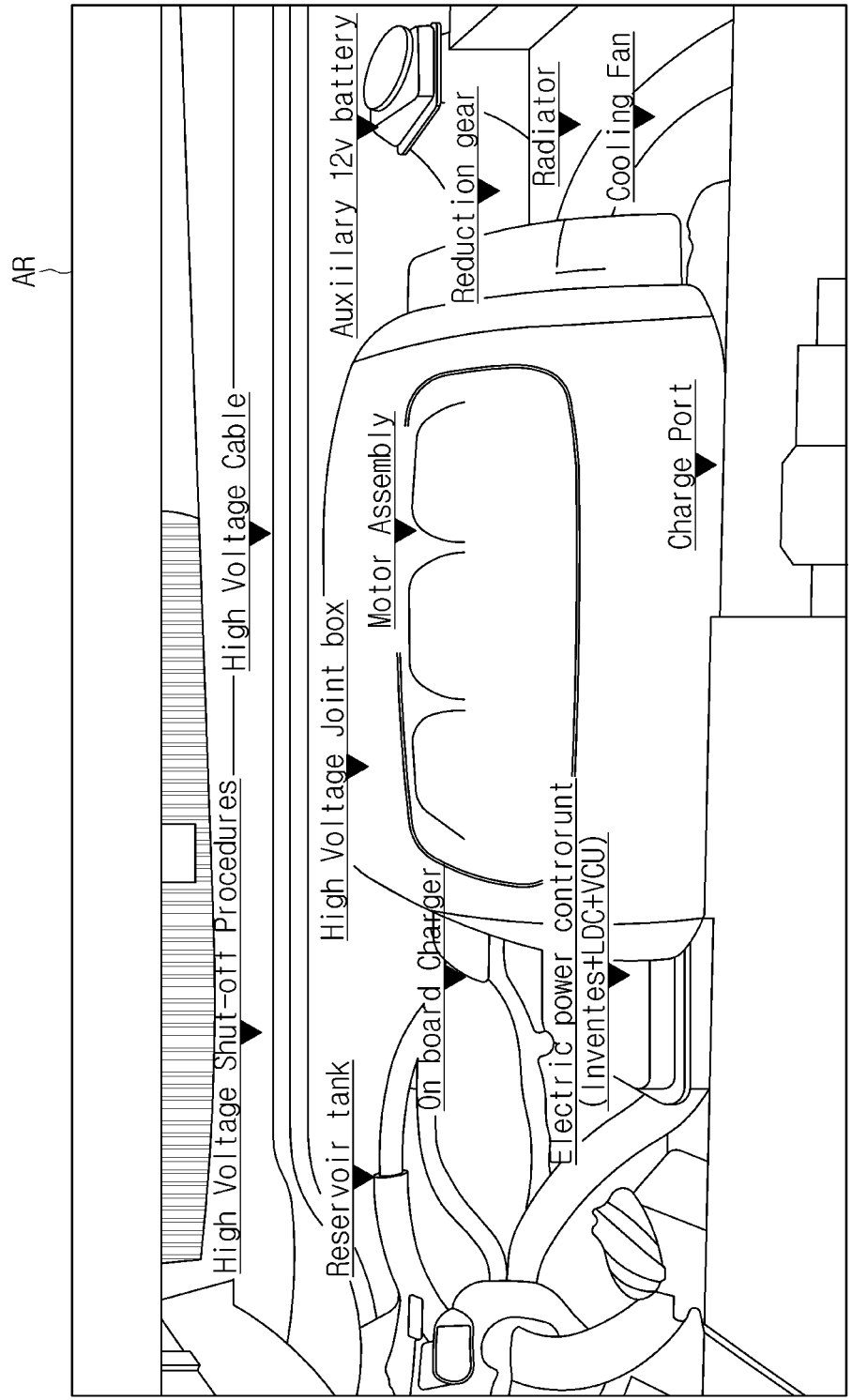
FIG. 5 is a view illustrating an example of providing information about parts of an engine room as an augmented reality image.

FIG. 5 is a view illustrating an example of providing information about parts of an engine room as an augmented reality image.

When the controller 120 identifies positions of parts shown in the engine room image IM, the identified location information of the parts may be used in various ways to perform malfunction diagnosis, repair, or the like of the vehicle.

For example, location information of the parts recognized by the controller 120 may be transmitted to the wearable device 130, and the wearable device 130 may output information about the parts of the engine room 10 as an augmented reality image as illustrated in FIG. 5. The augmented reality image output by the wearable device 130 may be a 2D image or a 3D image.

Particularly, the display 131 may display names of parts respectively overlaid on real world positions of the parts of the engine room 10 based on the transmitted location information of the parts.

The user wearing the wearable device 130 may recognize the parts of the engine room 10 based on the output augmented reality image.

Meanwhile, information provided to the user via the wearable device 130 may be output as the augmented reality image AR via the display 131, and a control instruction of the user may be input as a gesture, motion, or speech.

Figure 6:
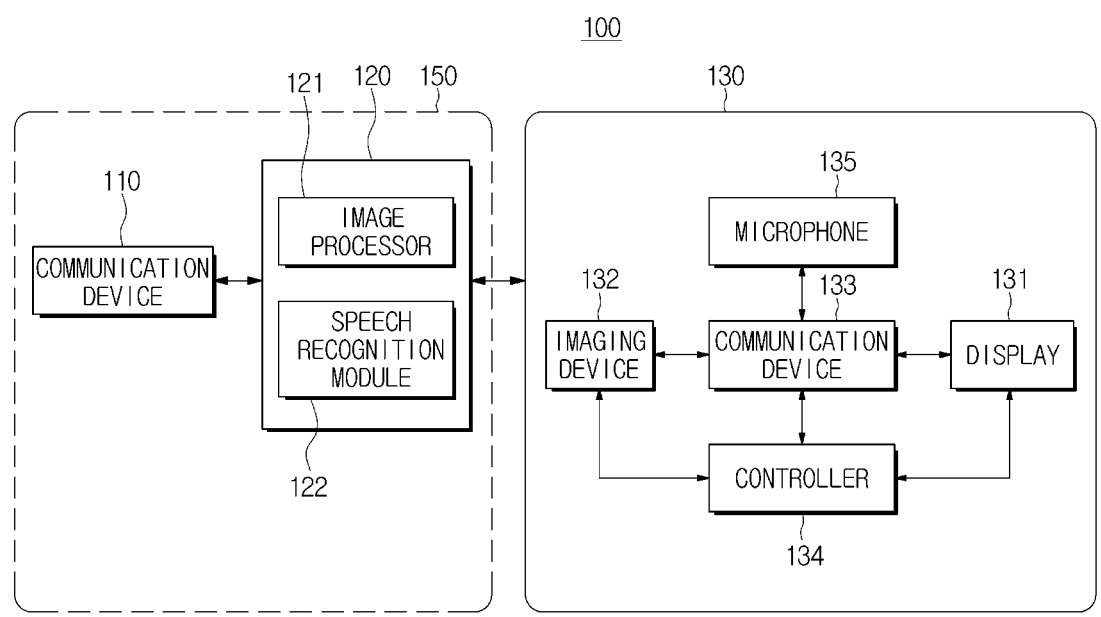
FIG. 6 is a control block diagram of a vehicle diagnosis apparatus including a wearable device further including a microphone.
Figure 7:
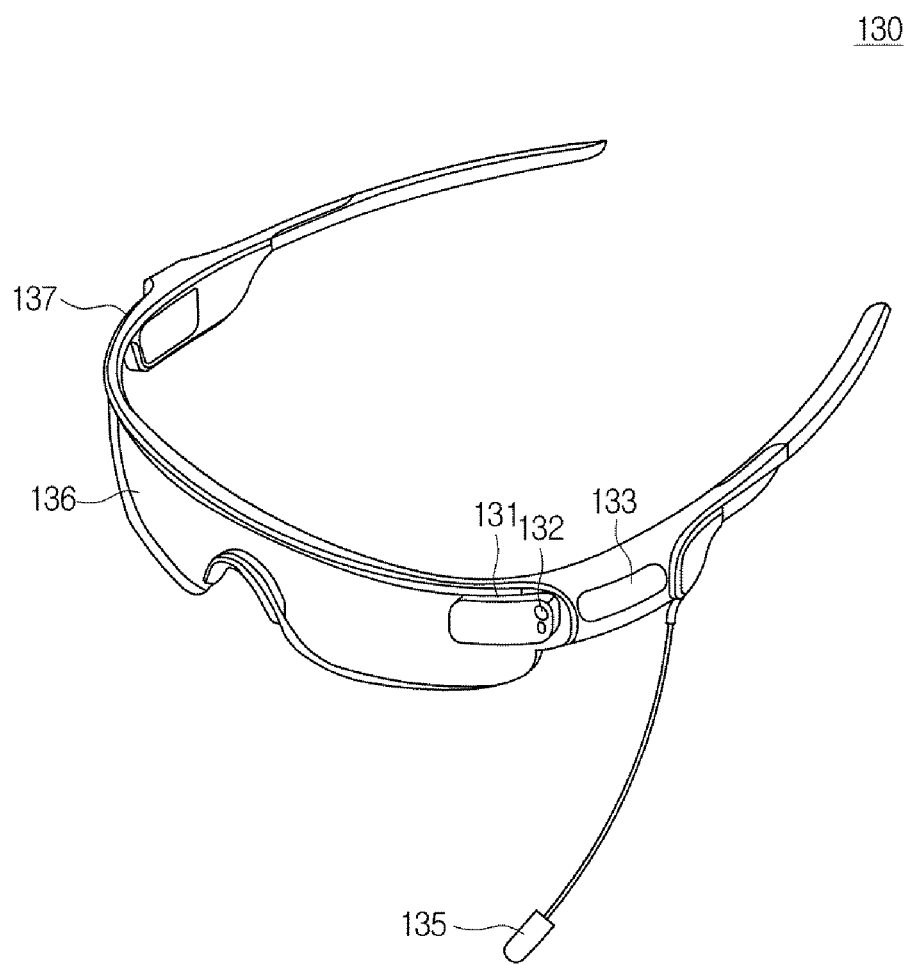
FIG. 7 is a perspective view of a wearable device further including a microphone.

FIG. 6 is a control block diagram of a vehicle diagnosis apparatus including a wearable device further including a microphone. FIG. 7 is a perspective view of a wearable device further including a microphone.

Referring to FIGS. 6 and 7, the wearable device 130 may further include a microphone 135 to receive a speech of the user. When a speech is input to the microphone 135 by an utterance of the user, the microphone 135 converts the speech into an electric signal and transmits the electric signal to the control module 150 via the communication device 133. In addition, the microphone 135 may include an analog-digital converter that converts an analog speech signal into a digital speech signal and transmit the digital speech signal to the control module 150.

The controller 120 of the control module 150 may include an image processor 121 that acquires required information by processing an image input via the wearable device 130 and a speech recognition module 122 that recognizes a speech input via the wearable device 130 as described above.

Operation of the image processor 121 is the same as that described above with reference to FIG. 4, and detailed descriptions thereof will not be given herein.

The speech recognition module 122 may include a preprocessor configured to preprocess an input speech signal, a recognition engine configured to recognize the preprocessed speech signal, and a memory configured to store a model used for speech recognition.

The preprocessor may remove a noise signal from the speech signal and extract a feature vector. For example, the preprocessor may consider an initial period of the input speech signal as a noise period instead of a real speech period and extract a signal included in the noise period as a noise signal. However, this method is an example of extracting a noise signal, and the noise may also be extracted by using any other method.

The preprocessor may extract features from the speech signal. In this case, the extracted features may be vectors. For example, the preprocessor may extract feature vectors by apply a vector extracting technique, such as Cepstrum, Linear Predictive Coding (LPC), Mel Frequency Cepstral Coefficient (MFCC), or Filter Bank Energy, to the speech signal from which the noise signal is removed.

The recognition engine may include a speech recognition engine that recognizes a speech signal via comparison between the extracted feature vector and a trained reference pattern. For example, a speech recognition engine may use acoustic modeling which compares signal characteristics of speeches by modeling and language modeling which models semantic relations of a linguistic sequence of words or syllables to be recognized. A reference pattern or model used in comparison of feature vectors may be stored in the memory.

Acoustic modeling may be classified into direct comparison modeling which sets a target of recognition as a feature vector model and comparing the feature vector model with a feature vector of speech data and statistical modeling which statistically processes feature vectors of a target of recognition.

The direct comparison modeling is a method including setting units to be recognized such as words and phonemes as a feature vector model, and comparing the feature vector model with an input speech, and Vector Quantization is a representative example thereof.

The statistical modeling is a method including constituting a unit to be recognized as a state sequence including of a plurality of nodes and using relations between the state sequences. The method of using state sequences includes methods using Dynamic Time Warping (DTW), Hidden Markov Model (HMM), and Neural networks.

Meanwhile, since the language modeling that models semantic relations of linguistic sequence of words or syllables applies semantic relations of units constituting language to units obtained by speech recognition, acoustic ambiguity and recognition errors may be reduced. Examples of the language modeling include statistical language modeling and Finite State Automata (FSA)-based modeling, and the statistical language modeling uses chain probability of words such as Unigram, Bigram, and Trigram.

The recognition engine may use any one of the aforementioned speech recognition methods.

Meanwhile, the speech recognition module 122 may not be included in the control module 150 but in the external server. In this case, when the control module 150 transmits the speech signal to the external server via the communication device 110, the external server may recognize the speech and transmit the result of speech recognition back to the control module 150.

Figure 8:
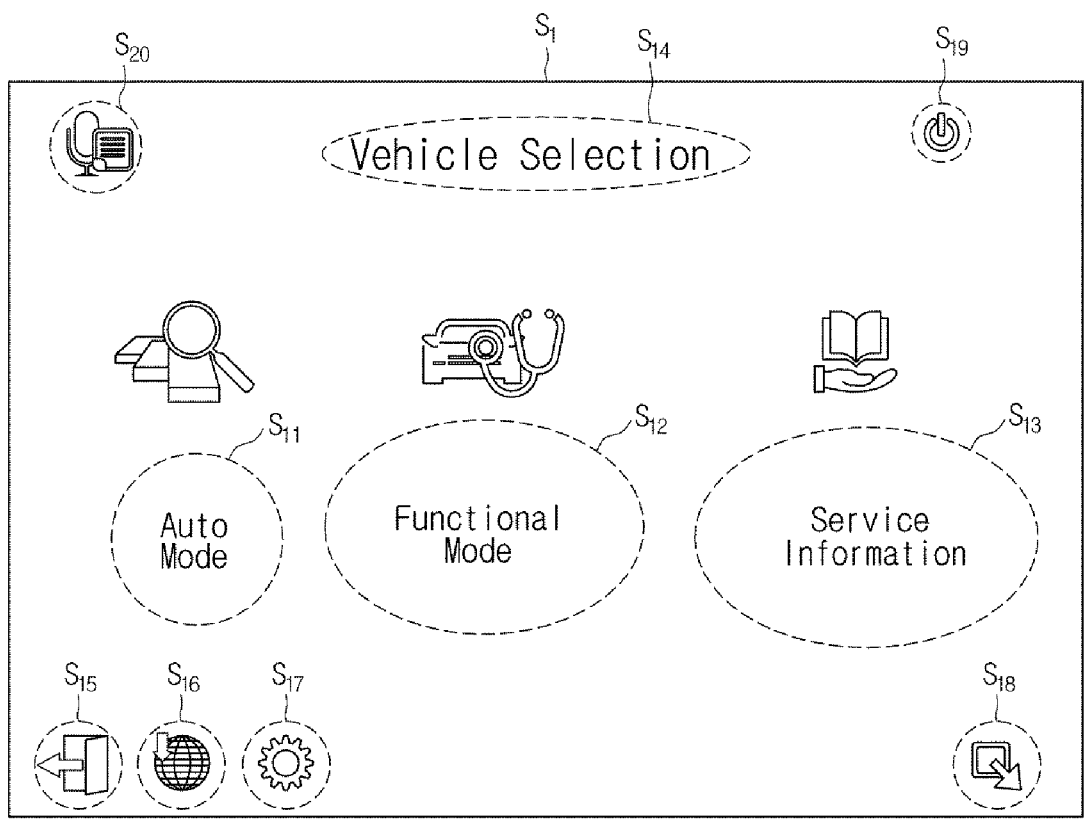
FIGS. 8 and 9 are views exemplarily illustrating screens output to a user via a wearable device.
Figure 9:
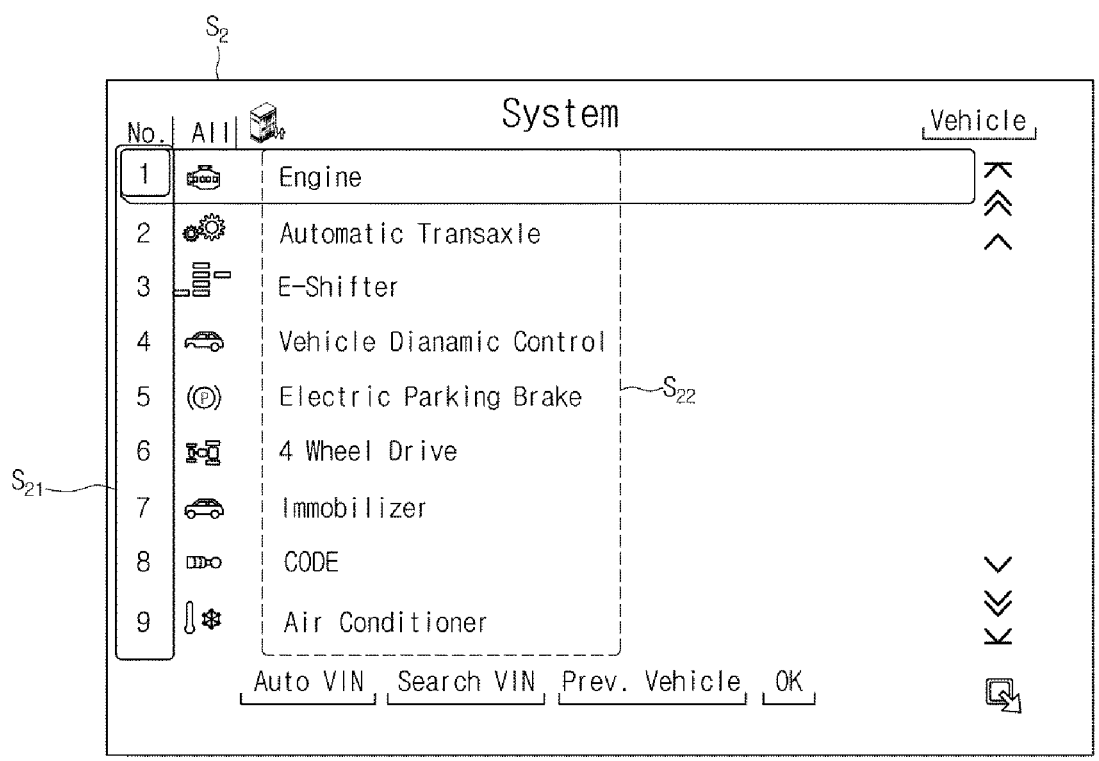

FIGS. 8 and 9 are views exemplarily illustrating screens output to a user via a wearable device.

A main screen or initial screen $S_1$, as illustrated in FIG. 8, may be output via a display 131. Menu icons to receive a control instruction from the user may be displayed on the initial screen $S_1$.

For example, a menu icon $S_{11}$ to guide selection of an automatic diagnosis mode to automatically diagnose malfunctions of the vehicle and a menu icon $S_{12}$ to guide selection of a functional mode to diagnose malfunctions on the function basis may be displayed on the initial screen $S_1$. A menu icon $S_{13}$ to guide selection of service information may also be displayed thereon.

Also, a menu icon $S_{14}$ to guide selection of a vehicle type, a menu icon $S_{15}$ to guide a log-out, a menu icon $S_{16}$ to guide updating the Internet, a menu icon $S_{17}$ to guide settings, a menu icon $S_{18}$ to guide screen off, a menu icon $S_{19}$ to guide end of a program, and a menu icon $S_{20}$ to guide execution of speech recognition may be displayed on the initial screen $S_1$.

The menu icons may be displayed as text or images that indicate the menus.

The menu icons may be selected by speech recognition or gesture recognition. Among the menu icons displayed on the initial screen $S_1$, the menu icons $S_{11}$ to $S_{20}$ selected by speech recognition may be displayed using a predetermined color to inform the user that the menu icons shown with the predetermined color may be selected by speech recognition.

For example, when the user wearing the wearable device 130 utters "Auto Mode", a speech signal input through the microphone 135 is transmitted to the control module 150 and the control module 150 may execute an automatic diagnosis mode by recognizing the uttered "Auto Mode".

When the automatic diagnosis mode is executed, a sequential malfunction diagnosis is automatically performed. The display 131 may output a system selection screen $S_2$ to select a system subject to malfunction diagnosis, and the user may select a desired system among the displayed systems.

Since the system selection may also be performed by speech recognition, numbers may be allocated to the systems so as to select the desired system without uttering a complicated name of the system. Allocation information of the systems and the numbers may be stored in the control module 150. A system name list $S_{22}$ and a number list $S_{21}$ listing the numbers allocated to respective system names may also be displayed on the system selection screen $S_2$.

For example, in order to select an engine, the user may utter number 1 allocated to the engine. If a speech of the user is input via the microphone 135 and transmitted to the controller 120, the controller 120 recognizes number 1 and performs malfunction diagnosis for the engine allocated thereto.

Meanwhile, the menu icons or items of the list displayed on the initial screen $S_1$ or the system selection screen $S_2$ may also be selected by gesture recognition. Even while the initial screen $S_1$ or the system selection screen $S_2$ is output via the display 131, the imaging device 132 acquires forward images and the acquired images are transmitted to the control module 150.

The initial screen $S_1$ or the system selection screen $S_2$ may also be output as an augmented reality image. The user may indicate, with a hand, a position corresponding to a desired menu icon or desired item of the list on the initial screen $S_1$ or the system selection screen $S_2$ displayed in a state of integrated with a real world image.

The controller 120 may recognize the hand of the user on the image received from the wearable device 130 and determine the menu icon or the item of the list at the position corresponding to the hand of the user. Then, the controller 120 performs operation corresponding to the determined menu icon or item of the list. Gesture recognition will be described in more detail later.

As described above, if the control instruction is input by the user wearing the wearable device 130 by uttering a speech or making a gesture without performing complicated manipulation, convenience and concentration of the user are enhanced, thereby improving reliability of the result of work.

Figure 10:
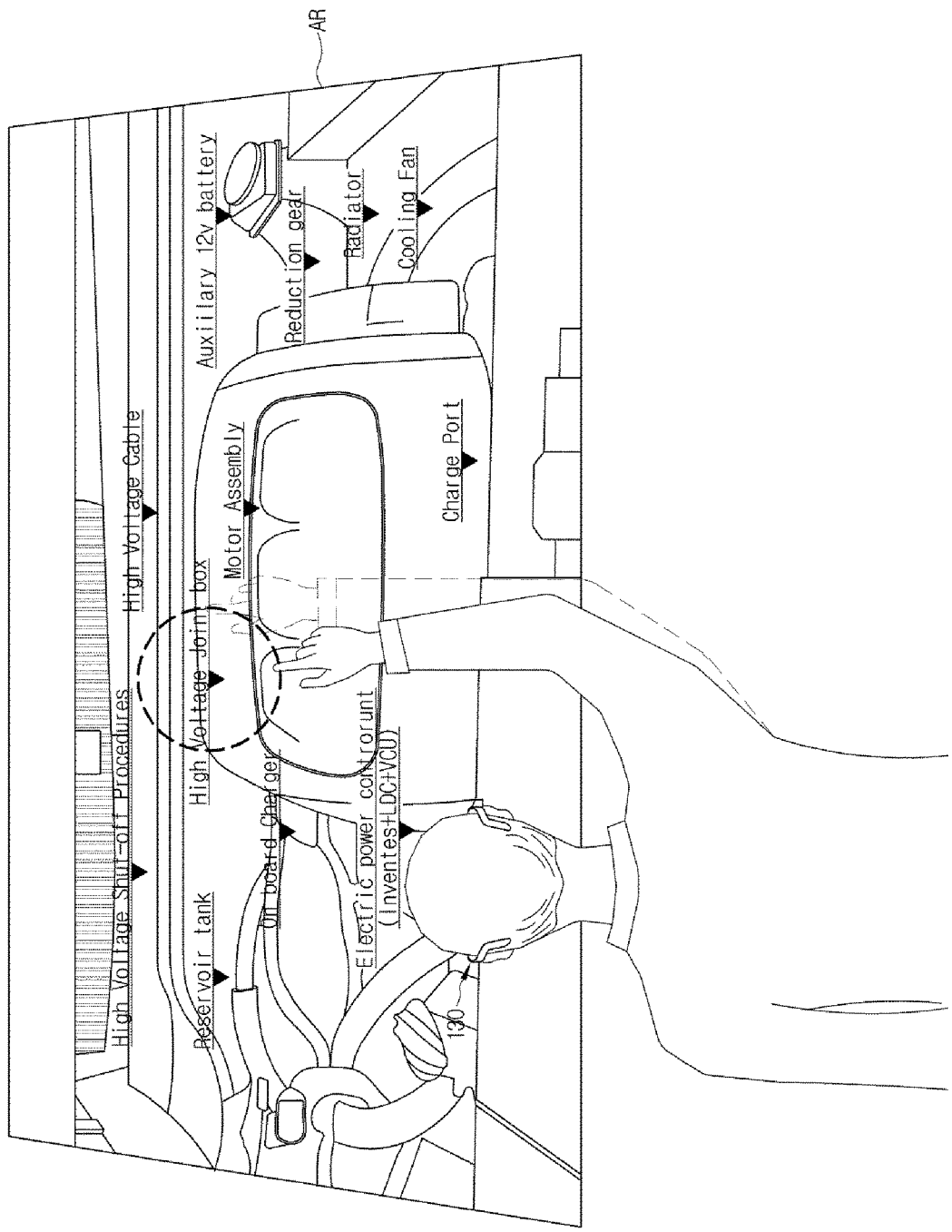
FIGS. 10 to 12 are views illustrating various examples of selecting a target part of malfunction diagnosis by a user.
Figure 11:
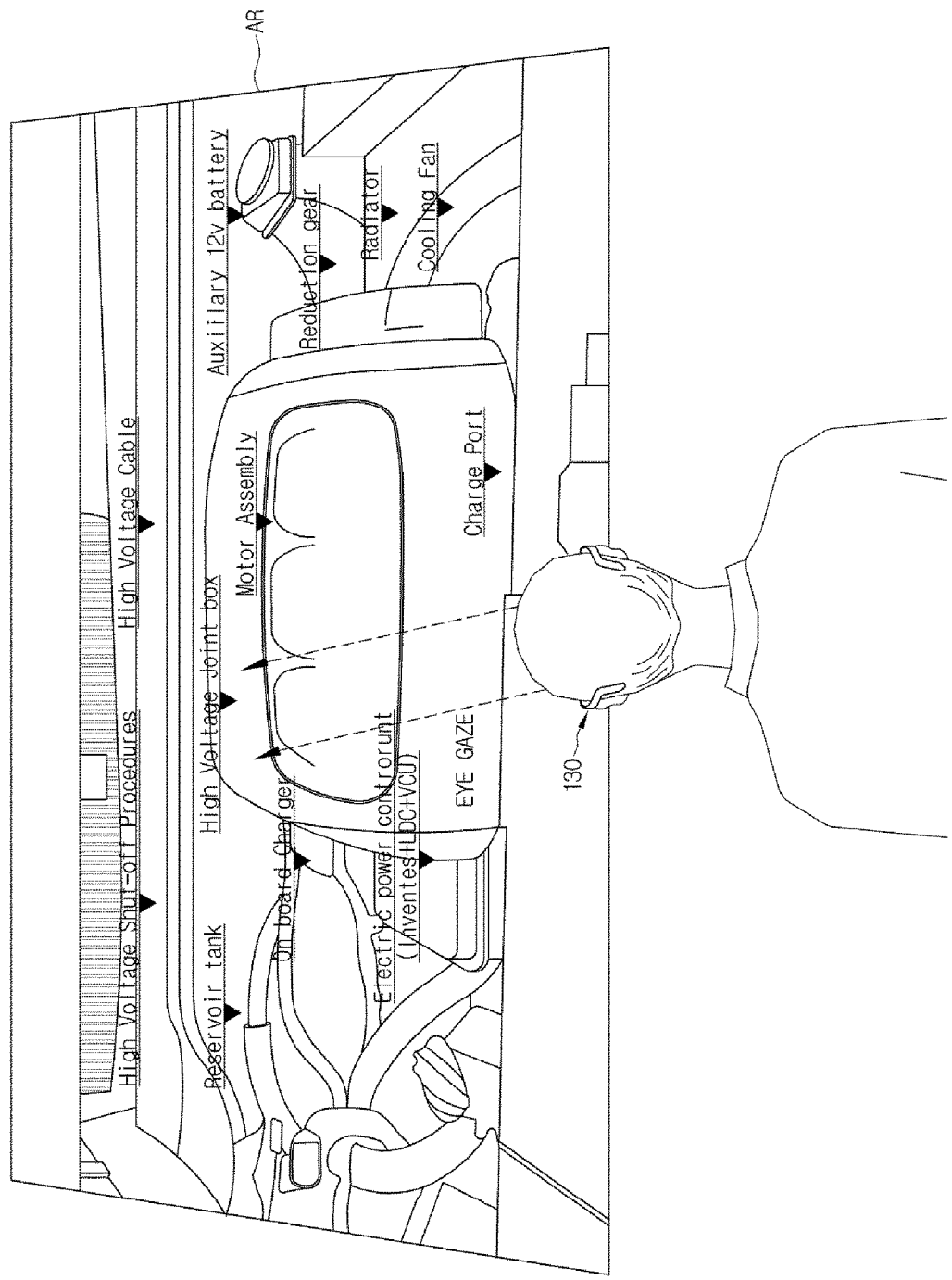
Figure 12:
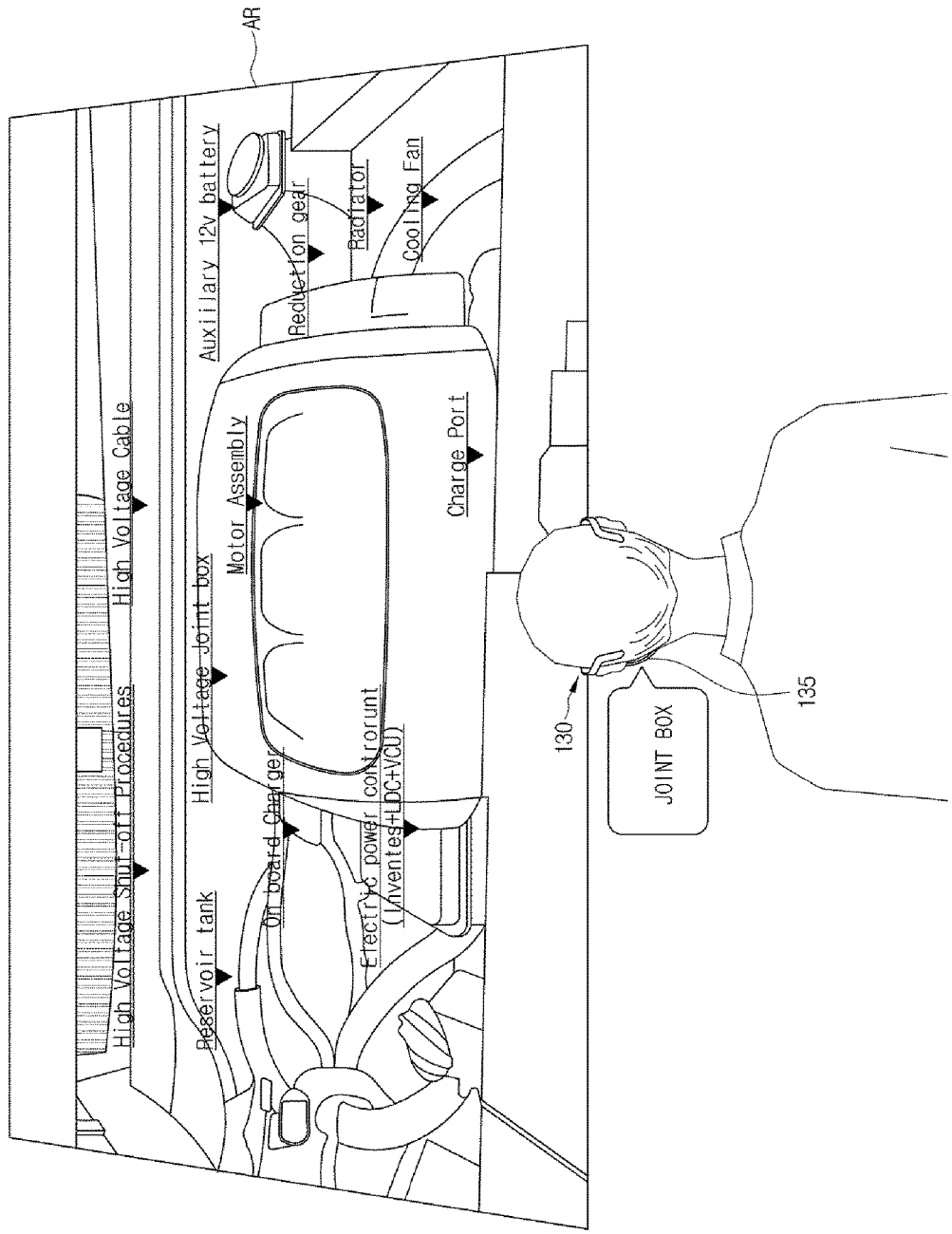

FIGS. 10 to 12 are views illustrating various examples of selecting a target part of malfunction diagnosis by a user.

As illustrated in FIG. 10, the user wearing the wearable device 130 may make a gesture of drawing a circle around a part subject to malfunction diagnosis in a state of gazing at the engine room 10. As used herein, the gesture refers to not only a static gesture but also a motion gesture.

The imaging device 132 may acquire an engine room image IM and transmit the acquired image to the control module 150. In this regard, the engine room image IM may be a moving image. However, the gesture is an example applicable to embodiments of the present disclosure, and any other gesture that is recognized from the image and prestored may also be used to select a target part of malfunction diagnosis.

The controller 120 of the control module 150 may recognize a gesture of the user from the received engine room image IM. First, the controller 120 may recognize the hand of the user by applying the object recognition algorithm thereto. If the hand of the user makes a gesture having prestored characteristics or a prestored pattern, the controller 120 may determine a part located at a position where the user makes the gesture and select the part as a target part of malfunction diagnosis.

For example, when the user makes a gesture of drawing a circle around a joint box, the controller 120 may recognize the gesture from the engine room image IM acquired by the imaging device 132 and select the joint box located where the gesture is made as the target part of malfunction diagnosis.

When the part is selected, the controller 120 may transmit a DTC request message to the vehicle via the communication device 110.

Alternatively, as illustrated in FIG. 11, the user wearing the wearable device 130 may gaze at a part subject to malfunction diagnosis while staring at the engine room 10.

The imaging device 132 may further include a camera acquiring a backward image in addition to the camera acquiring a forward image in order to acquire an image of a pupil. The acquired forward image and backward image are transmitted to the control module 150. In this case, the forward image is an image of the engine room, i.e., engine room image IM, and the backward image is an image of the pupil of the user, i.e., pupil image.

The controller 120 may recognize the pupil of the user from the backward image and determine a position of a part in the forward image at which the pupil of the user gazes based on positional relations between the forward image and the backward image. In addition, the controller 120 may determine a part at which the pupil of the user gazes and select the part as a target part of malfunction diagnosis.

For example, when the user gazes at the joint box, the controller 120 may recognize the pupil of the user in the backward image acquired by the imaging device 132 and determine that the joint box is located in the forward image at which the pupil of the user gazes based on positional relations between the forward image and the backward image.

Likewise, when the part is selected, the controller 120 may transmit a DTC request message to the vehicle via the communication device 110.

Alternatively, as illustrated in FIG. 12, the user wearing the wearable device 130 may utter a name of a part subject to malfunction diagnosis. The uttered speech is input through the microphone 135, and the controller 120 may determine the target part of malfunction diagnosis by recognizing a speech signal.

For example, when the user utters "joint box", the microphone 135 transmits a speech signal corresponding to the uttered speech to the control module 150, and the controller 120 may recognize a command included in the speech signal as "joint box".

As described above, when the user selects the target part of malfunction diagnosis while gazing at the engine room 10, the display 131 may output information about parts included in the engine room 10 as an augmented reality image AR as illustrated in FIGS. 10 to 12.

As described above with reference to FIG. 5, the display 131 may display names of the parts respectively overlaid on real world positions of the parts of the engine room 10.

If information about the parts included in the engine room 10 is output as the augmented reality image AR, the user may accurately recognize the position of each part and accurately select the target part of malfunction diagnosis.

However, the embodiment is not limited thereto, and the controller 120 may also receive a selected target part of malfunction diagnosis in a state that the augmented reality image AR is not output.

Figure 13:
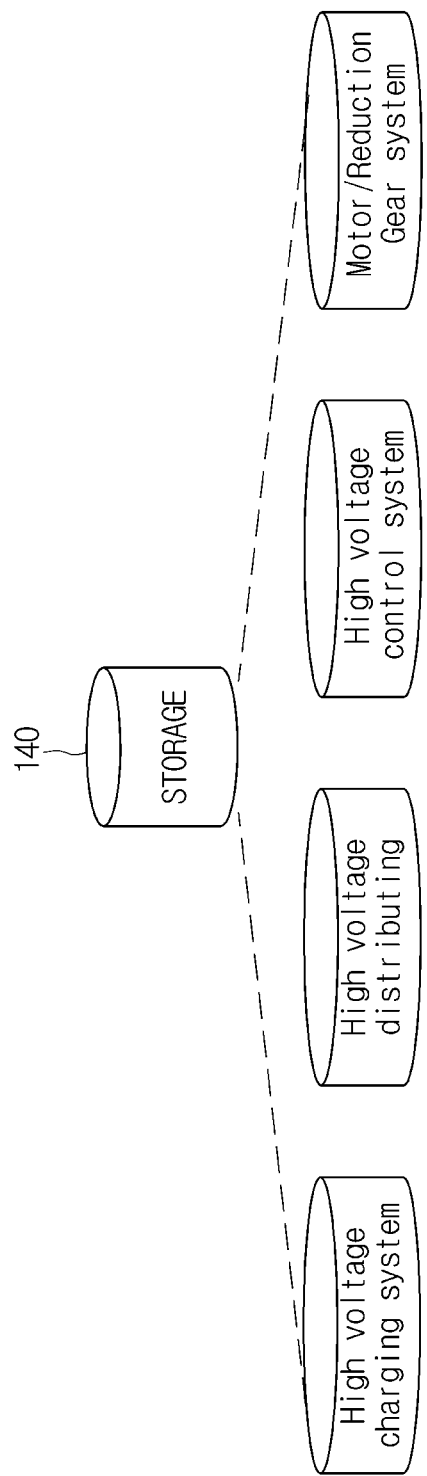
FIG. 13 is a view illustrating a storage to store main systems included in an engine room in a database.

FIG. 13 is a view illustrating a storage to store main systems included in an engine room in a database.

Referring to FIG. 13, the storage 140 may store single parts included in the engine room 10 in four groups according to main systems, and the storage 140 may be included in the control module 150.

For example, parts included in the engine room 10 may be grouped into four system groups of High Voltage Charging System, High Voltage Distributing System, High Voltage Control System, and Motor/Reduction Gear System and single parts included in each group may be stored in a database.

Also, parts included in the lower portion of the vehicle may be stored in groups classified according to the main systems in a database.

According to the aforementioned embodiments, single parts selected by the user by using a gesture, speech, eye gaze, or the like, are determined as target parts of malfunction diagnosis. According to another embodiment of the present disclosure, a system including the single parts selected by the user may be determined as the target of malfunction diagnosis.

For example, when the user selects the joint box as described above, the control module 150 compares the selected joint box with single parts of the systems stored in the storage 140 in groups to determine that the joint box is included in the high voltage distributing system. The control module 150 may transmit a DTC request message to the vehicle about the high voltage distributing system.

Meanwhile, when the target part of malfunction diagnosis is selected, accuracy of selection may be increased by combining the aforementioned gesture recognition, eye gaze recognition, and speech recognition. This will be described with reference to the drawings.

Figure 15:
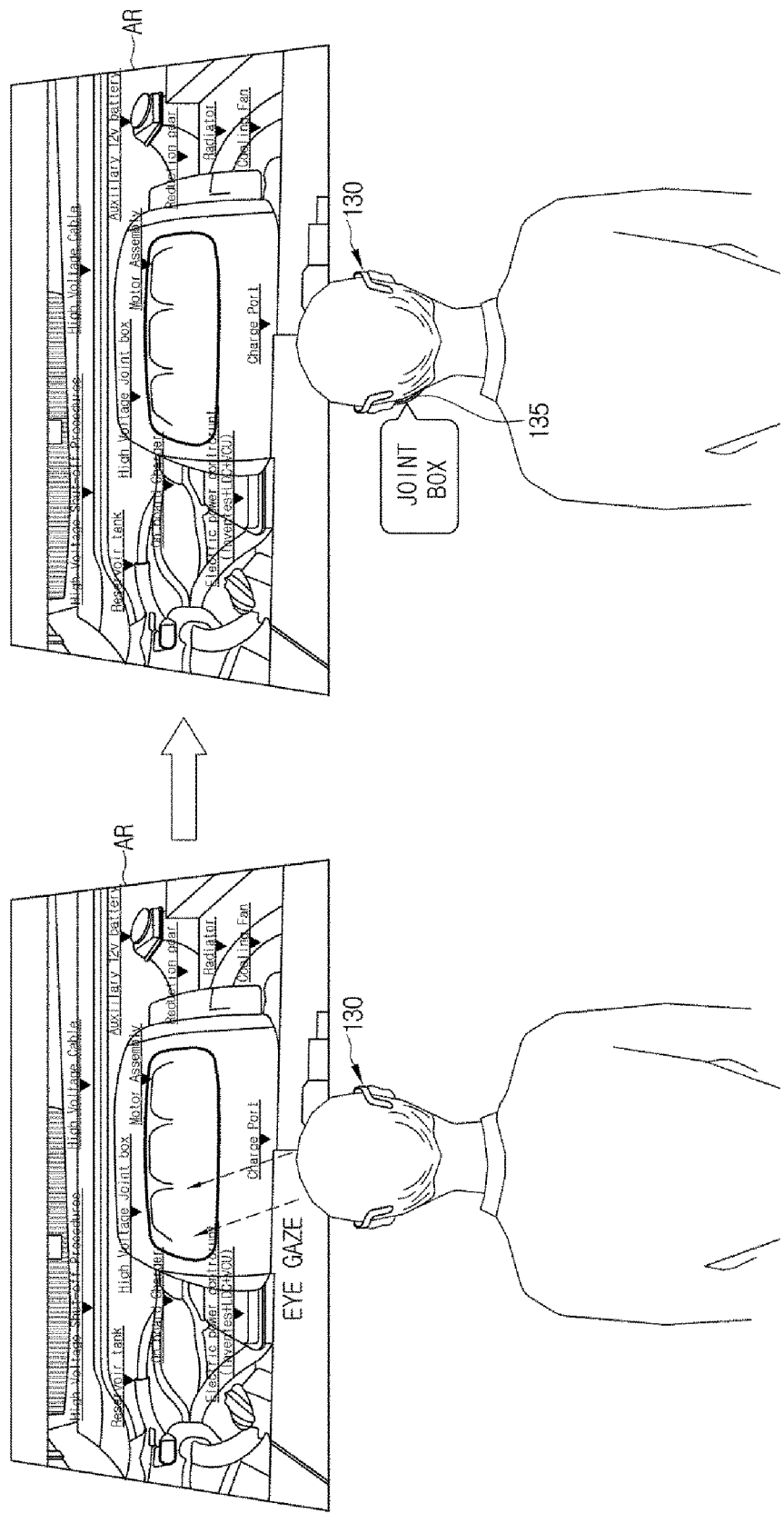
FIG. 15 is a view illustrating an example of selecting a target part of malfunction diagnosis by combining eye gaze recognition and speech recognition.

FIG. 14 is a view illustrating an example of selecting a target part of malfunction diagnosis by combining eye gaze recognition and gesture recognition. FIG. 15 is a view illustrating an example of selecting a target part of malfunction diagnosis by combining eye gaze recognition and speech recognition.

Referring to FIG. 14, one of the plurality of systems included in the engine room 10 may be determined by eye gaze recognition, and then one of the single parts included in the determined system may be determined by gesture recognition.

Particularly, when the user gazes at a given system of the engine room 10, for example, the high voltage distributing system, the controller 120 may determine that the user gazes at the high voltage distributing system by comparing a forward image with a backward image acquired by the imaging device 132.

In addition, when the user makes a given gesture prestored with respect to the joint box included in the high voltage distributing system, the controller 120 may recognize the gesture of the user from an engine room image acquired by the imaging device 132 and determine the joint box as a target part of malfunction diagnosis.

In this case, since the high voltage distributing system is primarily determined, and the joint box included in the high voltage distributing system is secondarily determined, accuracy of determination may be improved.

Alternatively, the system may be determined by gesture recognition, and the single part may be determined by eye gaze recognition.

Alternatively, the system may be determined by both eye gaze recognition and gesture recognition or the single part may be determined by both eye gaze recognition and gesture recognition.

Referring to FIG. 15, one of the plurality of systems included in the engine room 10 may be determined by eye gaze recognition, and then one of the single parts included in the determined system may be determined by speech recognition.

Particularly, when the user gazes at a given system of the engine room 10, for example, the high voltage distributing system, the controller 120 may determine that the user gazes at the high voltage distributing system by comparing a forward image and a backward image acquired by the imaging device 132.

In addition, when the user utters the joint box included in the high voltage distributing system, the controller 120 may recognize the "joint box" from the speech signal received from the microphone 135 and determines the joint box as the target part of malfunction diagnosis. In this case, since the controller 120 only compares a speech recognition database in which single parts included in the high voltage distributing system are stored, with the speech signal, time required for speech recognition may be reduced.

In addition, as described above, since the high voltage distributing system is primarily determined, and the joint box included in the high voltage distributing system is secondarily determined, accuracy of determination may be improved.

Alternatively, the system may be determined by gesture recognition, and the single part may be determined by eye gaze recognition.

Alternatively, the system may be determined by both eye gaze recognition and gesture recognition or the single part may be determined by both eye gaze recognition and gesture recognition.

Meanwhile, in the examples illustrated in FIGS. 14 and 15, a system including a single part may be determined as a target of malfunction diagnosis by determining the single part by both eye gaze recognition and gesture recognition or by both eye gaze recognition and speech recognition, and comparing the determined single part with single parts stored in the storage 140 as the database.

When the user selects the target part of malfunction diagnosis by applying one of the aforementioned examples, the control module 150 transmits a DTC request message about the selected part to the vehicle, and the vehicle transmits a DTC about the selected part to the control module 150 in response thereto.

Alternatively, the control module 150 may receive DTCs about all systems and transmit only information about a DTC of a part selected by the user to the wearable device 130.

Figure 16:
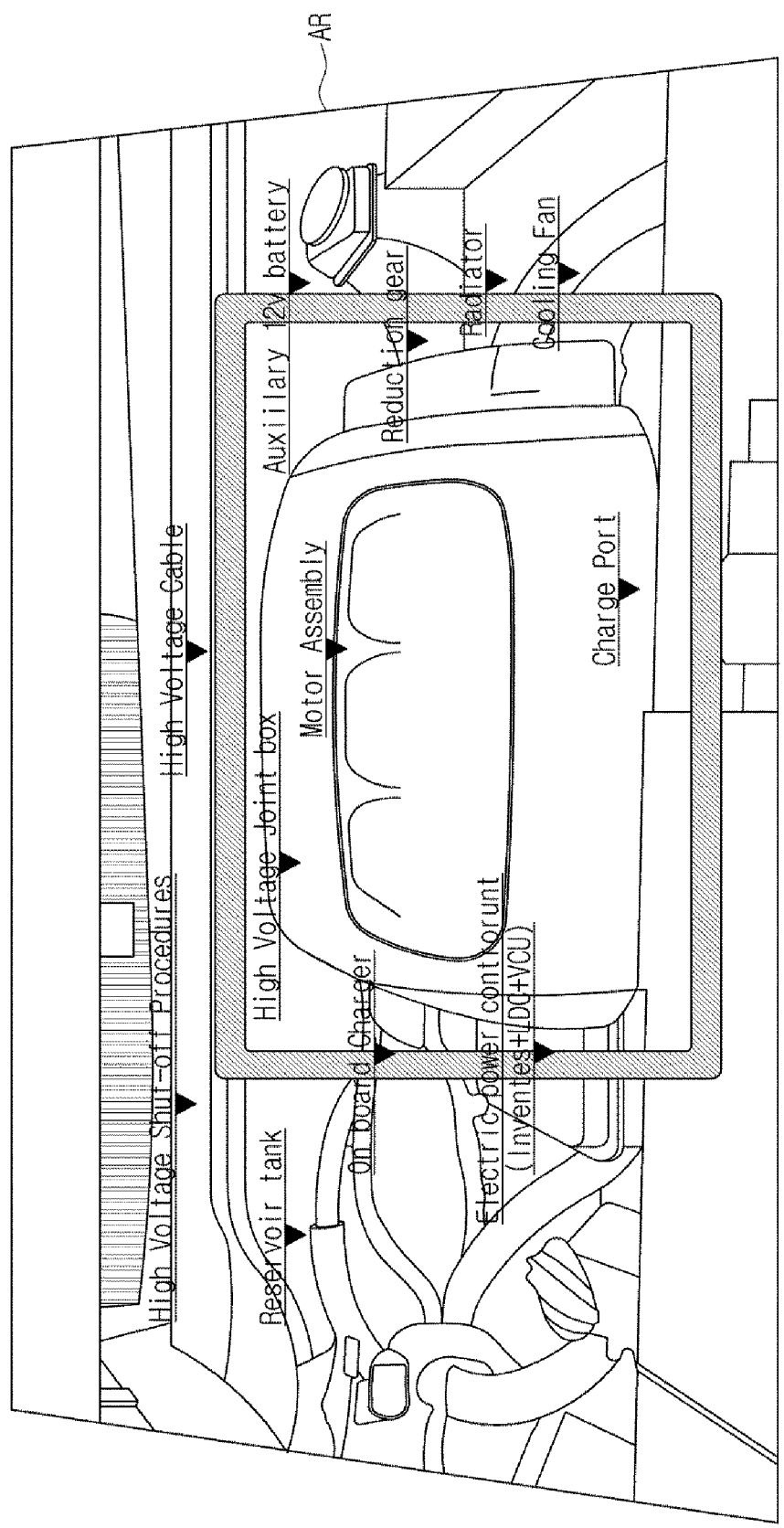
FIG. 16 is a view illustrating an example of providing information about a DTC via an augmented reality image.

FIG. 16 is a view illustrating an example of providing information about a DTC via an augmented reality image.

If a DTC of a part selected by the user is present, the display 131 may inform the user of the DTC by outputting an augmented reality image using a method of displaying borders of the part or the entire part with a color as illustrated in FIG. 16.

Alternatively, DTCs may be displayed with different colors. For example, a currently present DTC may be displayed in red, a DTC present in the past may be displayed in yellow, and a DTC expected in the future may be displayed in orange.

However, embodiments of the present disclosure are not limited thereto, and any other method may be used so long as visually recognizable contents are overlaid on the part indicated by the DTC. For example, the displayed color may blink.

As described above, if information about the DTC is provided in the form of the augmented reality image integrated with the real part, the user may intuitionally and easily recognize the part indicated by the DTC.

The vehicle diagnosis apparatus 100 may also guide a repair of the part indicated by the DTC in addition to providing information about the DTC.

Figure 17:
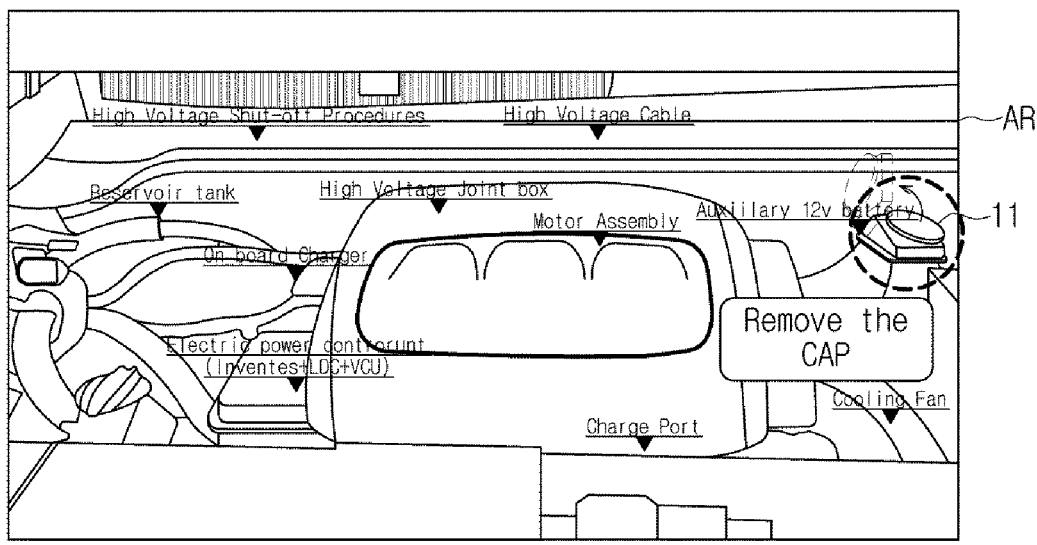
FIGS. 17 to 19 are views illustrating examples of providing information to guide a repair of a part by using an augmented reality image.
Figure 18:
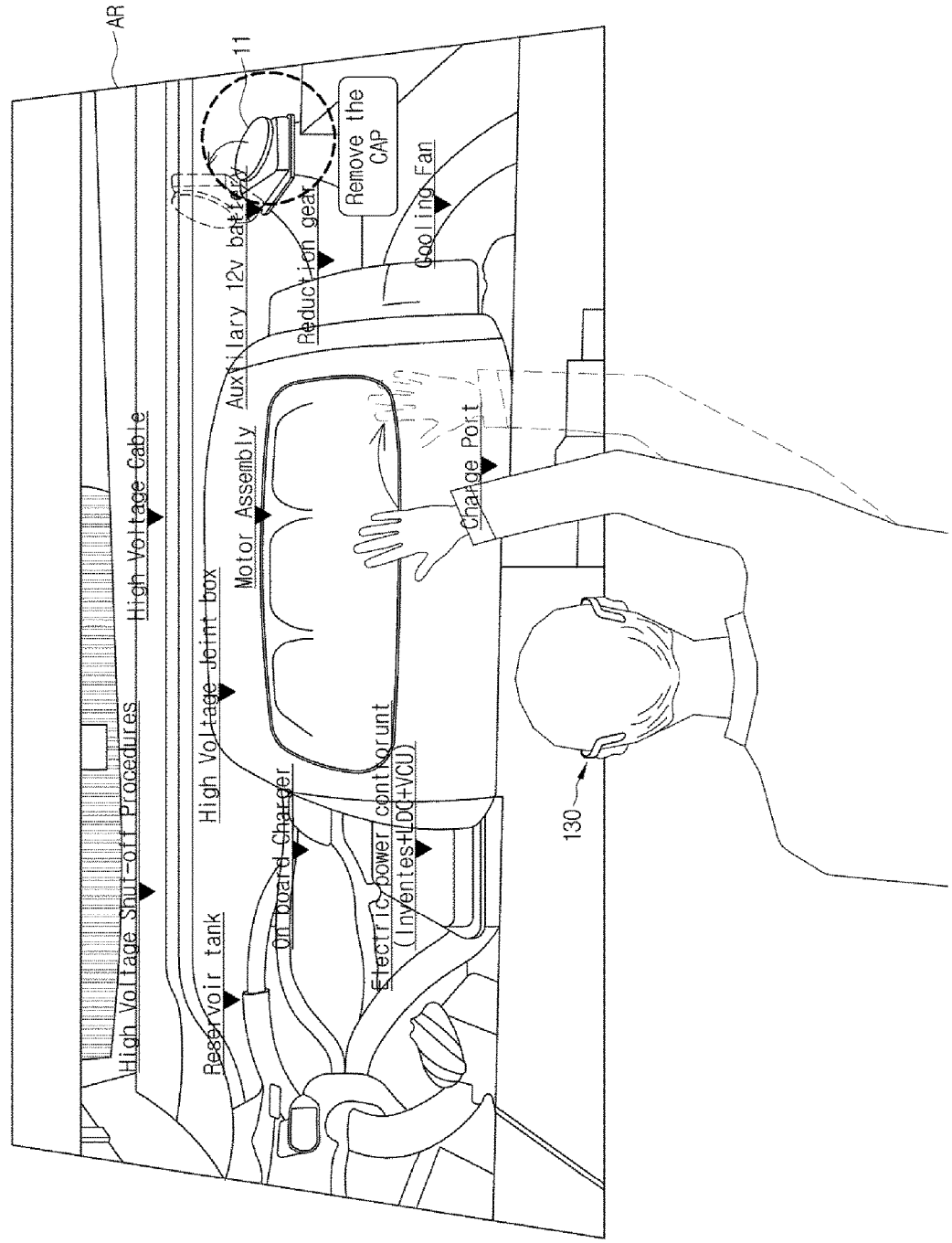
Figure 19:
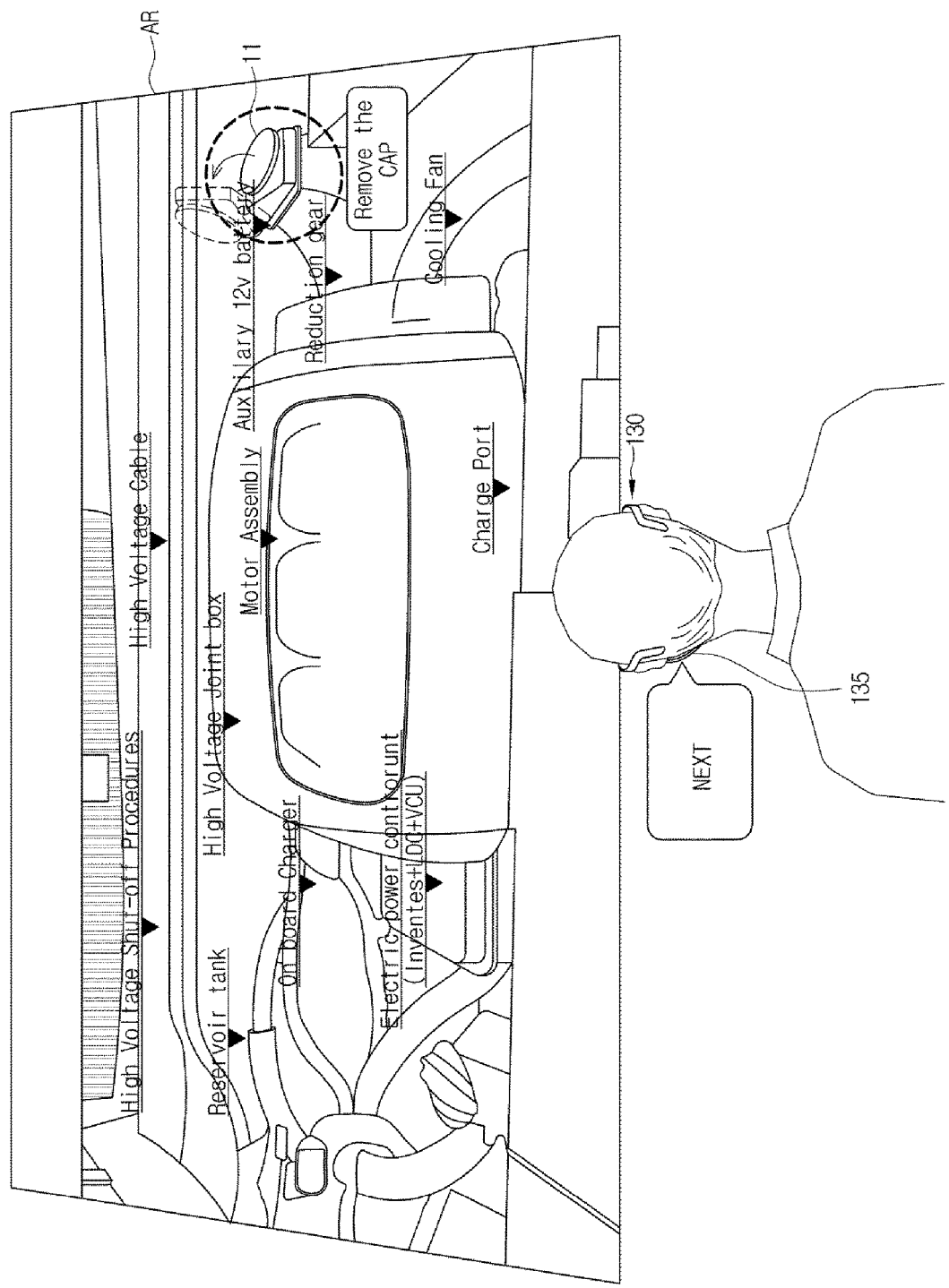

FIGS. 17 to 19 are views illustrating examples of providing information to guide a repair of a part by using an augmented reality image.

For example, when a DTC about a brake oil of the engine room 10 is notified and the brake oil needs to be changed, the display 131 may display an image to guide removal of a brake oil cap together with a text message instructing the removal of the brake oil cap at a position corresponding to a brake oil reservoir 11 as illustrated in FIG. 17.

The user may simultaneously identify information and repair the part by receiving information required for the repair as an augmented reality image overlaid on real world surroundings. Thus, difference in work efficiency or work reliability depending on proficiency of the user may be reduced.

If information to guide the repair includes a plurality of stages, a repair process may proceed to a next stage in accordance with a user's command.

For example, when the user makes a left-right swipe gesture with a hand as illustrated in FIG. 18, and the imaging device 132 acquires an engine room image and transmits the image to the control module 150, the control module 150 may recognize the gesture of the user shown in the engine room image and transmit a control signal to provide information of the next stage to the wearable device 130. To this end, the swipe gesture may be stored in a state of being mapped as a gesture to proceed to the next stage of repair.

As another example, when the user utters "next" as illustrated in FIG. 19, the microphone 135 may transmit a speech signal corresponding to the input speech to the control module 150, the control module 150 may recognize "NEXT" from the speech signal and transmit a control signal to provide information of the next stage to the wearable device 130. To this end, the "NEXT" may be stored in a state of being mapped as a command to proceed to the next stage of repair.

Any other gestures or commands may also be stored in a state of being mapped in addition to the aforementioned examples.

Also, information to guide the repair of the part may be provided as a moving image, and speech information may also be provided by using a speaker provided at the wearable device 130.

Figure 20:
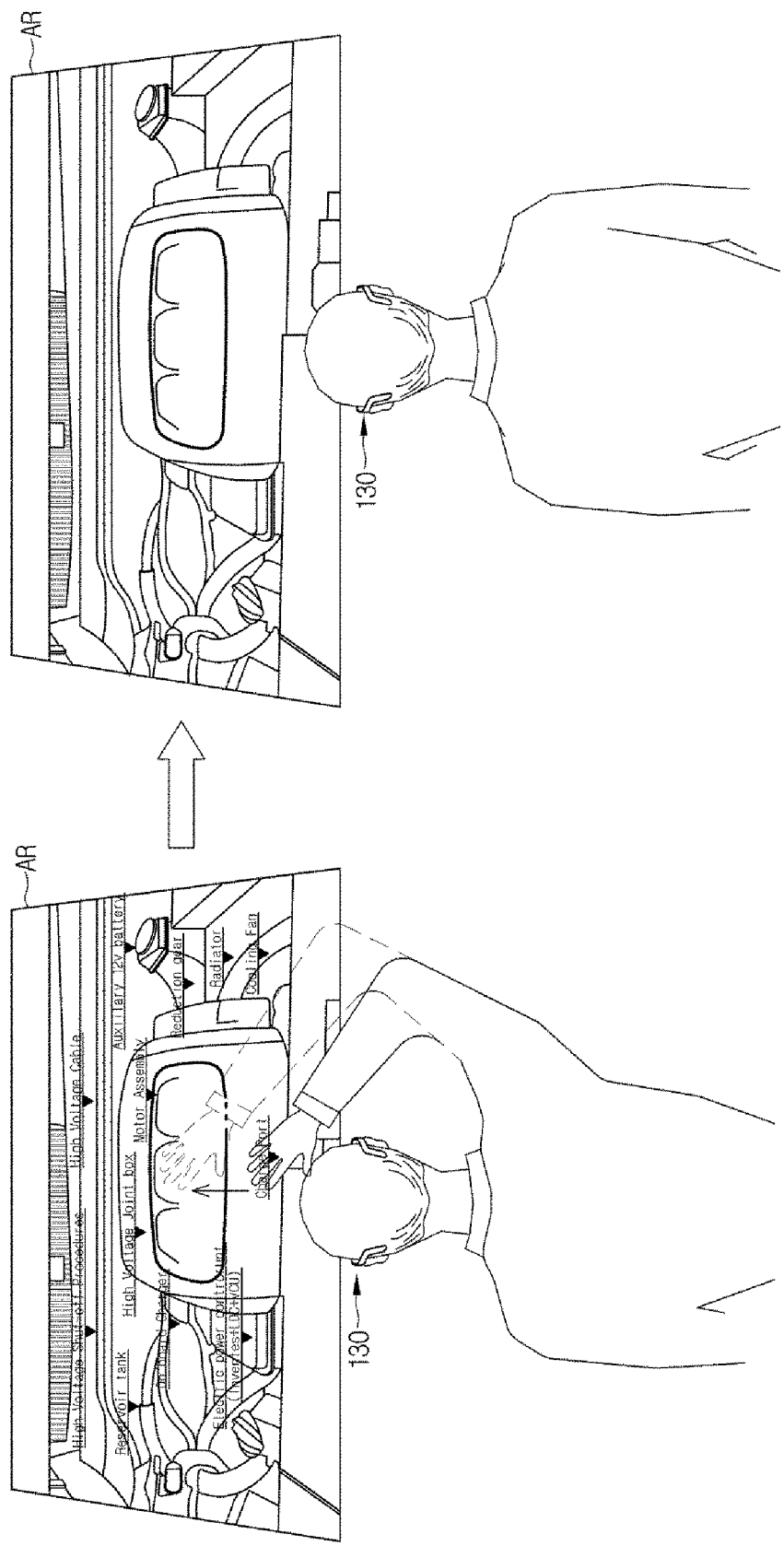
FIG. 20 is a view illustrating an example of a gesture to remove an augmented reality image.

FIG. 20 is a view illustrating an example of a gesture to remove an augmented reality image.

Meanwhile, when the user proceeds a repair, contents output as an augmented reality image may not be required. In this case, a screen in which the augmented reality image is output may be turned off by making a gesture previously mapped to screen off as illustrated in FIG. 20.

For example, in case an up-down swipe gesture is stored in a state of being mapped to the screen off, when the user makes the up-down swipe gesture and the imaging device 132 acquires an engine room image and transmits the image to the control module 150, the control module 150 may recognize the gesture of the user shown in the engine room image and transmit a control signal to turn off the screen to the wearable device 130.

Also, the screen may be turned off when the user utters a speech command previously stored in a state of being mapped to the screen off.

Although the control module 150 and the wearable device 130 are separated from each other according to the aforementioned embodiment, the control module 150 may also be integrated with the wearable device 130 as described above. That is, in this case, operation of the control module 150 described above may be performed by the wearable device 130. For example, operation of the controller 120 of the control module 150 may be performed by the controller 134 of the wearable device 130, operation of the communication device 110 may be performed by the communication device 133 of the wearable device 130, and the storage 140 may be disposed in the wearable device 130.

Alternatively, the storage 140 may be provided at the external server, and the wearable device 130 may access the external server via the communication device 133 to search for desired information. Alternatively, information stored in the storage 140 described above may be partially stored in the external server.

Alternatively, a program that performs operation of the control module 150 may be stored in a storage medium of the external server, and the user may use the program as the control module 150 by downloading the program to a mobile device such as a smartphone, smartwatch, and a PDA.

The controlling operation may be implemented with execution of the program by one or more processors thereof.

According to the wearable device and the vehicle diagnosis apparatus including the wearable device, reliability and convenience of work may be enhanced since information required for diagnosis and repair of a vehicle is provided to the user via the augmented reality image and a control instruction of the user is input via a gesture, an eye gaze, or a speech.

As is apparent from the above description, according to the wearable device and the vehicle diagnosis apparatus including the wearable device, reliability and convenience of work may be enhanced since information required for diagnosis and repair of a vehicle is provided to the user via the augmented reality image and a control instruction of the user is input via a gesture, an eye gaze, or a speech.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle diagnosis apparatus comprising:
   a wearable device configured to acquire a forward image of a user;
   a controller configured to recognize at least one selected from the group consisting of a gesture and an eye gaze of the user from the forward image and determine a part of a vehicle corresponding to a position of the recognized gesture or the recognized eye gaze; and
   a communication device configured to transmit a diagnostic trouble code (DTC) request message about the determined part to the vehicle and receive a DTC about the determined part from the vehicle,
   wherein the wearable device outputs an augmented reality image to the user,
   wherein the controller determines a part located at a position corresponding to the recognized gesture or the recognized eye gaze as a target part of malfunction diagnosis,
   wherein the communication device transmits the DTC request message about the target part of malfunction diagnosis to the vehicle and receives the DTC about the target part of malfunction diagnosis from the vehicle,
   wherein the controller determines the target part of malfunction diagnosis based on the DTC, and
   wherein the wearable device outputs and displays a position corresponding to each of DTCs.

2. The vehicle diagnosis apparatus according to claim 1, wherein the controller recognizes one from a plurality of parts comprised in the vehicle from the forward image and transmits information about the recognized part to the wearable device.

3. The vehicle diagnosis apparatus according to claim 2, wherein the wearable device outputs the augmented reality image comprising the information about the recognized part.

4. The vehicle diagnosis apparatus according to claim 3, wherein the wearable device outputs the augmented reality image overlaying information about the recognized part on a position of the recognized part.

5. The vehicle diagnosis apparatus according to claim 1, further comprising a storage configured to store a plurality of single parts comprised in the vehicle in groups classified according to a plurality of systems.

6. The vehicle diagnosis apparatus according to claim 5, wherein the controller recognizes an eye gaze of the user from the forward image, determines a system of the vehicle corresponding to a position of the recognized eye gaze, recognizes a gesture of the user from the forward image, and determines a single part corresponding to a position of the recognized gesture among single parts comprised in the determined system.

7. The vehicle diagnosis apparatus according to claim 5, wherein the controller determines a single part located at a position corresponding to the recognized gesture or the recognized eye gaze and determines a system comprising the determined single part as a target of malfunction diagnosis.

8. The vehicle diagnosis apparatus according to claim 1, wherein the wearable device receives an input speech of the user and converts the input speech into an electric speech signal, and
   the controller recognizes a command comprised in the speech signal and determines a part corresponding to the recognized command as the target part of malfunction diagnosis.

9. The vehicle diagnosis apparatus according to claim 1, wherein the wearable device outputs information to guide a repair of the part indicated by the DTC as an augmented reality image.

10. The vehicle diagnosis apparatus according to claim 9, wherein the wearable device outputs an augmented reality image overlaying information to guide the repair of the part indicated by the DTC on a position of the part.

11. The vehicle diagnosis apparatus according to claim 9, wherein when the information to guide the repair of the part comprises a plurality of stages, the controller recognizes a gesture of the user from the forward image and transmits a control signal to output information of a next stage among the plurality of stages to the wearable device when the recognized gesture is a prestored gesture.

12. The vehicle diagnosis apparatus according to claim 1, wherein the wearable device outputs the augmented reality image overlaying a predetermined color on a positon of the part indicated by the DTC.

13. The vehicle diagnosis apparatus according to claim 1, wherein the controller recognizes a gesture of the user from the forward image and transmits a control signal to remove the augmented reality image to the wearable device when the recognized gesture is a prestored gesture.

14. A wearable device comprising:
   an imaging device configured to acquire a forward image of a user;
   a controller configured to recognize at least one selected from the group consisting of a gesture and an eye gaze of the user from the forward image and determine a part of a vehicle corresponding to a position of the recognized gesture or the recognized eye gaze; and
   a communication device configured to transmit a diagnostic trouble code (DTC) request message about the determined part to the vehicle and receive a DTC about the determined part from the vehicle,
   wherein the wearable device further comprises a display configured to output an augmented reality image overlaying a virtual image on a space at which the user gazes, wherein the controller determines a part located at a position corresponding to the recognized gesture or the recognized eye gaze as a target part of malfunction diagnosis, wherein the controller determines the target part of malfunction diagnosis based on the DTC, and wherein the wearable device outputs and displays a position corresponding to each of DTCs.

15. The wearable device according to claim 14, further comprising a storage configured to store a plurality of single parts comprised in the vehicle in groups classified according to a plurality of systems.

16. The wearable device according to claim 15, wherein the controller recognizes an eye gaze of the user from the forward image, determines a system of the vehicle corresponding to a position of the recognized eye gaze, recognizes a gesture of the user from the forward image, and determines a single part corresponding to a position of the recognized gesture among single parts comprised in the determined system.

17. The wearable device according to claim 15, wherein the controller determines a single part located at a position corresponding to the recognized gesture or the recognized eye gaze and determines a system comprising the determined single part as a target of malfunction diagnosis.

18. The wearable device according to claim 14, further comprising a microphone configured to receive an input speech of the user and convert the input speech into an electric speech signal, wherein the controller recognizes a command comprised in the speech signal and determines a part corresponding to the recognized command as a target part of malfunction diagnosis.

19. The wearable device according to claim 14, wherein the display outputs information to guide a repair of the part indicated by the DTC as the augmented reality image.

20. The wearable device according to claim 19, wherein the display outputs the augmented reality image overlaying information to guide the repair of the part indicated by the DTC on a position of the part.

21. The wearable device according to claim 19, wherein when the information to guide the repair of the part comprises a plurality of stages, the controller recognizes a gesture of the user from the forward image and transmits a control signal to output information of a next stage among the plurality of stages to the wearable device when the recognized gesture is a prestored gesture.

22. The wearable device according to claim 14, wherein the display outputs an augmented reality image overlaying a predetermined color on a positon of the part indicated by the DTC.

23. The wearable device according to claim 14, wherein the controller recognizes a gesture of the user from the forward image and transmits a control signal to remove the augmented reality image to the wearable device when the recognized gesture is a prestored gesture.

* * * * *